US008267792B2

(12) United States Patent
Buchholz et al.

(10) Patent No.: US 8,267,792 B2

(45) Date of Patent: Sep. 18, 2012

(54) MANAGING PORTABLE WAGERING GAME MACHINES

(75) Inventors: Dale R. Buchholz, Palatine, IL (US); Mark B. Gagner, West Chicago, IL (US); Robert A. Grom, Lake Zurich, IL (US); Vernon W. Hamlin, Lisle, IL (US); Craig J. Sylla, Round Lake, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 830 days.

(21) Appl. No.: 12/297,915

(22) PCT Filed: Apr. 23, 2007

(86) PCT No.: PCT/US2007/009722

§ 371 (c)(1), (2), (4) Date: Oct. 21, 2008

(87) PCT Pub. No.: WO2007/127149

PCT Pub. Date: Nov. 8, 2007

(65) Prior Publication Data

US 2009/0176559 A1 Jul. 9, 2009

Related U.S. Application Data

(60) Provisional application No. 60/745,493, filed on Apr. 24, 2006, provisional application No. 60/823,129, filed on Aug. 22, 2006.

(51) Int. Cl.
*A63F 13/00* (2006.01)

(52) U.S. Cl. ................ 463/42; 463/25; 463/29; 463/41; 380/251; 380/278

(58) Field of Classification Search .................... 463/25, 463/29, 41, 42; 380/251, 278
See application file for complete search history.

(56) References Cited

U.S. PATENT DOCUMENTS

| | | | | |
|---|---|---|---|---|
| 6,104,815 | A | 8/2000 | Alcorn et al. | |
| 6,508,710 | B1 | 1/2003 | Paravia et al. | |
| 6,778,820 | B2 | 8/2004 | Tendler | |
| 7,329,186 | B2 * | 2/2008 | Griswold et al. | 463/29 |
| 7,515,718 | B2 * | 4/2009 | Nguyen et al. | 380/278 |

(Continued)

FOREIGN PATENT DOCUMENTS

WO WO-2007127149 11/2007

OTHER PUBLICATIONS

"International Application Serial No. PCT/US2007/009722, Written Opinion mailed Jul. 23, 2008", 7 pgs.

(Continued)

*Primary Examiner* — Pierre Eddy Elisca
*Assistant Examiner* — Shahid Kamal
(74) *Attorney, Agent, or Firm* — Schwegman Lundberg & Woessner, P.A.

(57) ABSTRACT

Systems and methods manage the presentation of wagering games on a portable wagering game machine. The systems and methods determine if an authorized user is in possession of the portable wagering game machine, and further determine if the portable wagering game machine is in a location where wagering games are authorized to be presented.

18 Claims, 7 Drawing Sheets

U.S. PATENT DOCUMENTS

| | | | | |
|---|---|---|---|---|
| 7,798,901 | B2 * | 9/2010 | Nguyen et al. | 463/29 |
| 2003/0060286 | A1 * | 3/2003 | Walker et al. | 463/42 |
| 2008/0254897 | A1 * | 10/2008 | Saunders et al. | 463/43 |
| 2009/0088258 | A1 * | 4/2009 | Saunders et al. | 463/42 |
| 2009/0093312 | A1 * | 4/2009 | Carlson | 463/42 |
| 2009/0247302 | A1 * | 10/2009 | Kelly et al. | 463/42 |
| 2009/0270174 | A1 * | 10/2009 | Kelly et al. | 463/42 |
| 2010/0093429 | A1 * | 4/2010 | Mattice et al. | 463/25 |

OTHER PUBLICATIONS

"International Application Serial No. PCT/US2007/009722, Search Report mailed Jul. 23, 2008", 4pgs.

* cited by examiner

MANAGING PORTABLE WAGERING GAME MACHINES

RELATED APPLICATIONS

This patent application is a U.S. National Stage Filing under 35 U.S.C. 371 from International Patent Application Serial No. PCT/US2007/009722, filed Apr. 23, 2007, and published on Nov. 8, 2007, as WO 2007/127149 A2, which claims the priority benefit of U.S. Provisional Patent Application Ser. No. 60/745,493 filed Apr. 24, 2006 and entitled "SYSTEMS AND METHODS FOR MANAGING PORTABLE WAGERING GAME MACHINES", and of U.S. Provisional Patent Application Ser. No. 60/823,129 filed Aug. 22, 2006 and entitled "SYSTEMS AND METHODS FOR MANAGING PORTABLE WAGERING GAME MACHINES", the contents of which are incorporated herein by reference in their entirety.

FIELD

The embodiments relate generally to portable wagering game machines and more particularly to managing portable wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright© 2006, 2007, WMS Gaming Inc. All Rights Reserved.

BACKGROUND

Wagering game machines have traditionally been operated as a stand alone unit, or linked in a network of some type to a group of gaming machines. In general, these traditional wagering game machines are relatively large and have not been portable. That is, once placed on a casino floor the wagering game machine does not move unless it is replaced with another wagering game machine or if the gaming establishment redesigns the layout of the casino floor.

However, as technology in the gaming industry progresses, some jurisdictions are moving towards allowing portable gaming machines. Portable wagering game machines are typically small, handheld devices that may be taken from place to place. While such portability provides increased flexibility to gaming establishments and may enhance a user's wagering game experience, several issues are presented regarding portable wagering game machines. A first issue is that jurisdictions typically restrict wagering games to limited locations within a gaming establishment. Such restrictions are more difficult to enforce with portable wagering game machines. Similarly, jurisdictions typically limit wagering game play to adults. Again, this restriction may be harder to enforce with portable wagering game machines because once authorized, a portable wagering game machine may be transferred (either intentionally or unintentionally) to a minor or other unauthorized user.

DETAILED DESCRIPTION

Figure 1:
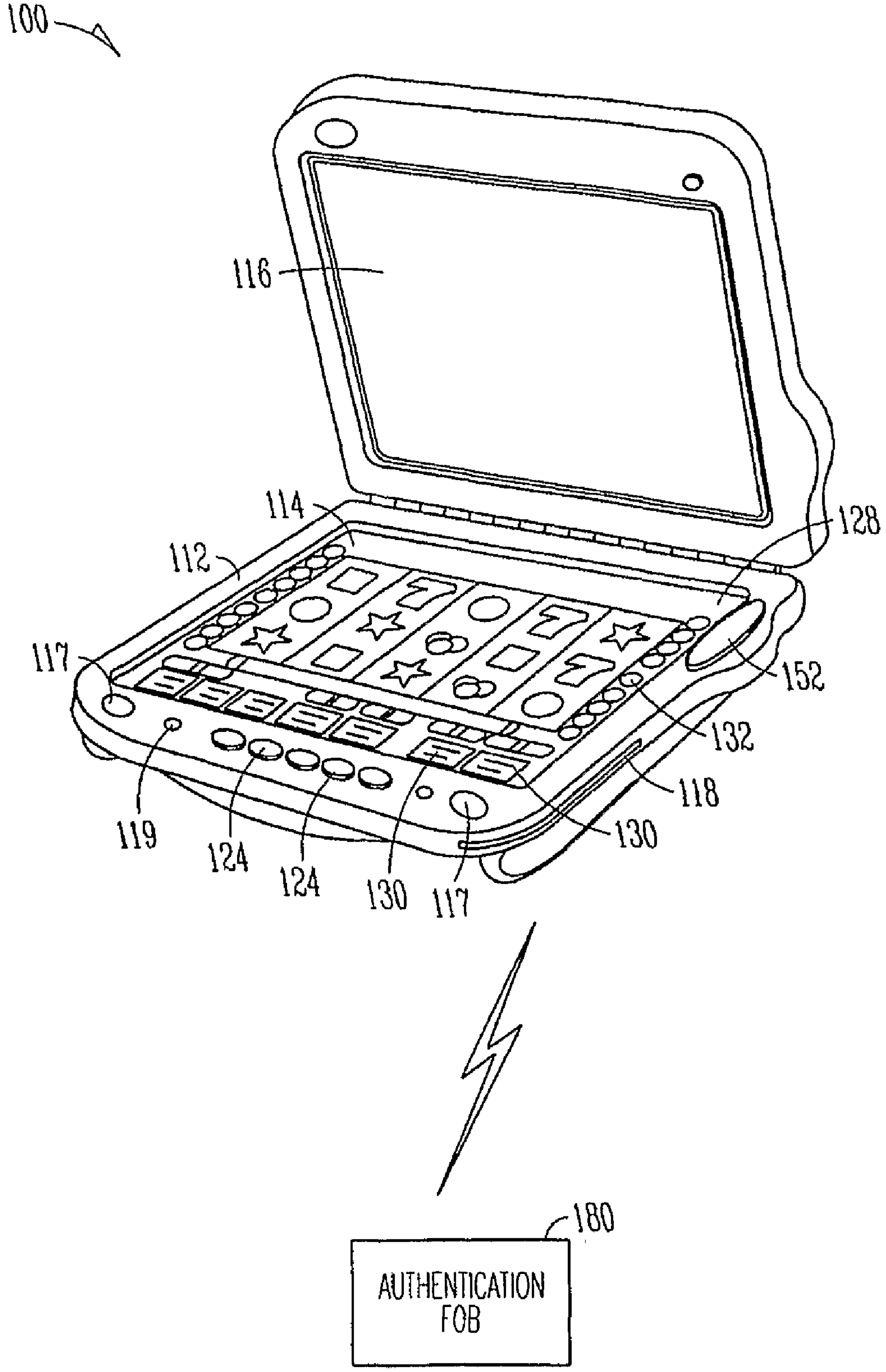
FIG. 1 is a perspective view of a portable wagering game machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

In general, the embodiments of the invention provide for management of portable wagering game machines, including determining whether the portable wagering game machine is authenticated and authorized to play wagering games, whether an authenticated and authorized user is currently using the portable wagering game machine, and whether the portable wagering game machine is in a location where wagering is allowed, or where a particular style of wagering is allowed.

FIG. 1 shows an example embodiment of a portable wagering game machine 100. The portable wagering game machine 100 can include any suitable electronic handheld or mobile device configured to play a video casino game such as blackjack, slots, keno, poker, blackjack, and roulette. The wagering game machine 100 comprises a housing 112 and includes input devices, including a value input device 118 and a player input device 124. For output, the wagering game machine 100 includes a primary display 114, and may include a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1, the wagering game machine 100 includes a secondary display 116 that is rotatable relative to the primary display 114. The optional secondary display 116 can be fixed, movable, and/or detachable/attachable relative to the primary display 114. Either the primary display 114 and/or secondary display 116 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 118 can comprise, for example, a slot located on the front, side, or top of the casing 112 configured to receive credit from a stored-value card (e.g., casino card, smart card, debit card, credit card, etc.) inserted by a player. The player-accessible value input device 118 can also comprise a sensor (e.g., an RF sensor) configured to sense a signal (e.g., an RF signal) output by a transmitter (e.g., an RF transmitter) carried by a player. The player-accessible value input device 118 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 100.

Still other player-accessible value input devices 118 can require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player can be permitted to access a player's account. As one potential optional security feature, the wagering game machine 100 can be configured to permit a player to only access an account the player has specifically set up for the wagering game machine 100. Other conventional security features can also be utilized to, for example, prevent unauthorized access to a player's account, to minimize an impact of any unauthorized access to a player's account, or to prevent unauthorized access to any personal information or funds temporarily stored on the wagering game machine 100.

The player-accessible value input device 118 can itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the wagering game machine 110, a transfer of value from one player account or source to an account associated with the wagering game machine 100, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 118 comprising a biometric player information reader can require a confirmatory entry from another biometric player information reader 152, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 can be provided remotely from the wagering game machine 110.

The player input device 124 may include a plurality of push buttons on a button panel for operating the wagering game machine 100. In addition, or alternatively, the player input device 124 can comprise a touch screen mounted to the primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button on the button panel. The touch keys 130 can be used to implement the same functions as push buttons. Alternatively, the push buttons 126 can provide inputs for one aspect of the operating the game, while the touch keys 130 can allow for input needed for another aspect of the game. The various components of the wagering game machine 100 can be connected directly to, or contained within, the casing 112, as seen in FIG. 1, or can be located outside the casing 112 and connected to the casing 112 via a variety of wired (tethered) or wireless connection methods. Thus, the wagering game machine 100 can comprise a single unit or a plurality of interconnected (e.g., wireless connections) parts which can be arranged to suit a player's preferences.

The operation of the basic wagering game on the wagering game machine 100 is displayed to the player on the primary display 114. The primary display 114 can also display a bonus game associated with the basic wagering game. The primary display 114 preferably takes the form of a high resolution LCD, a plasma display, an LED, or any other type of display suitable for use in the wagering game machine 100. The size of the primary display 114 can vary from, for example, about a 2-3" display to a 15" or 17" display. In at least some embodiments, the primary display 114 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 114 and/or secondary display 116 can have a 16:9 aspect ratio or other aspect ratio (e.g., 4:3). The primary display 114 and/or secondary display 116 can also each have different resolutions, different color schemes, and different aspect ratios.

A player typically begins play of the basic wagering game on the wagering game machine 100 by making a wager (e.g., via the value input device 118 or an assignment of credits stored on the portable wagering game machine 100 via the touch screen keys 130, player input device 124, or buttons 126) on the wagering game machine 100. In some embodiments, the basic game can comprise a plurality of symbols arranged in an array, and includes at least one payline 132 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 118 of the wagering game machine 100 can double as a player information reader 152 that allows for identification of a player by reading a card with information indicating the player's identity (e.g., reading a player's credit card, player ID card, smart card, etc.). The player information reader 152 can alternatively or also comprise a bar code scanner, RFID transceiver or computer readable storage medium interface. In one embodiment, the player information reader 152 comprises a biometric sensing device.

In some embodiments, a portable wagering game machine 100 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, an authentication fob 180 may be used in conjunction with a portable wagering game machine 100. In these embodiments, portable wagering game machine 100 attempts to detect the presence of the authentication fob 180. In some embodiments, the authentication fob 180 comprises a wristband worn by the user of the portable wagering game machine 100. In alternative embodiments the authentication fob 180 may be a device worn or carried by the user, or the authentication fob 180 may be attached to the clothing of the user.

The presence of an authentication fob 180 may be detected using any of several different methods. In some embodiments, the authentication fob 180 may be detected using passive or active RFID technology. In these embodiments, a passive or active RFID device may be embedded in the authentication fob, and an RFID sensor may be included as part of the portable wagering game machine 100. In alternative embodiments, wireless technology such as Bluetooth or IEEE 802.11 devices may be used.

Figure 2:
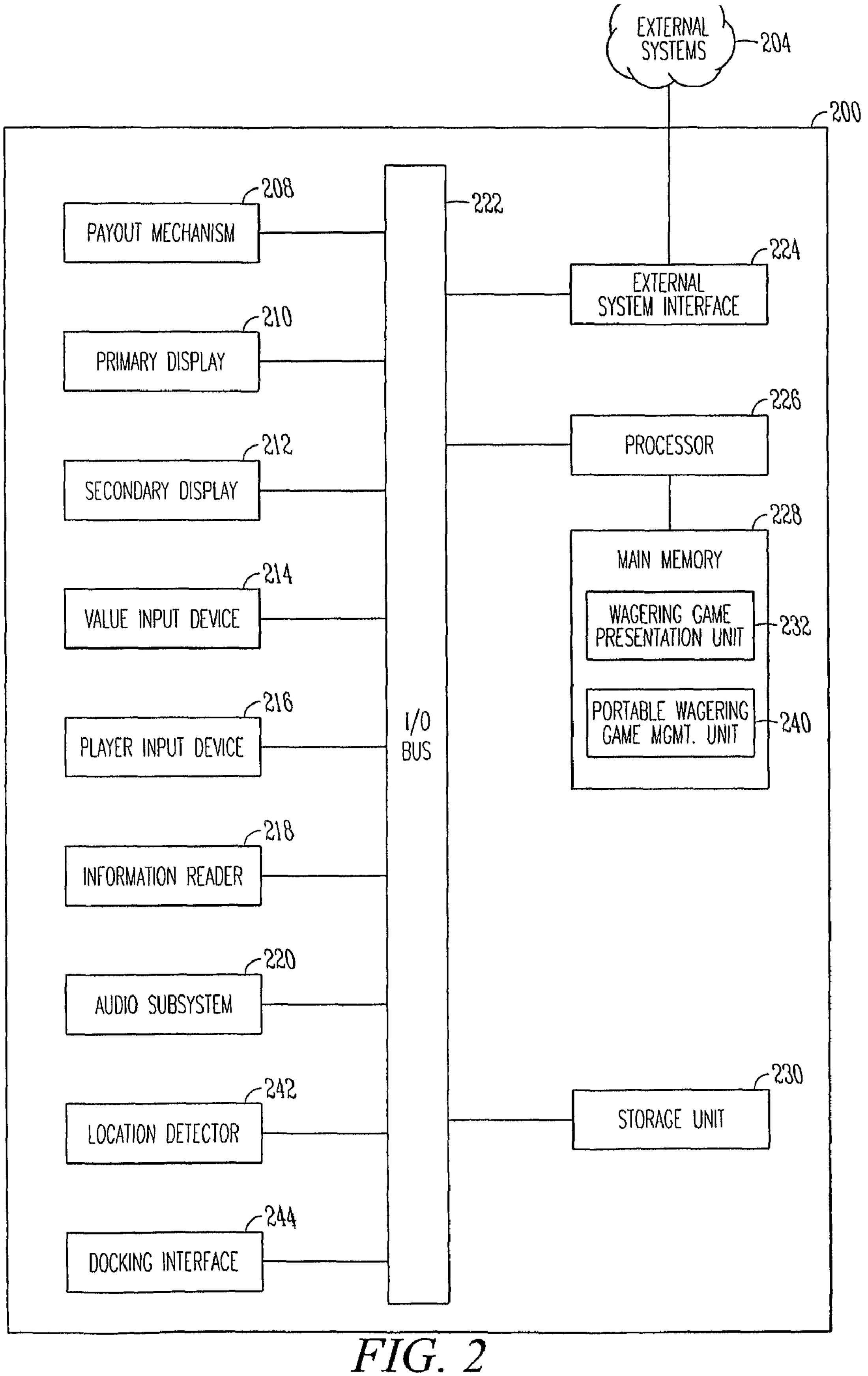
FIG. 2 is a block diagram of an architecture, including a control system, for a wagering game machine according to an example embodiment.

FIG. 2 is a block diagram illustrating an architecture 200, including a control system, for a portable wagering game machine, according to example embodiments of the invention. As shown in FIG. 2, the architecture 200 includes a processor 226 connected to main memory 228, which may include portable wagering game presentation unit 232 and portable wagering game management unit 240. In one embodiment, the wagering game presentation unit 232 can present wagering games, such as video poker, video blackjack, video slots, video lottery, etc., in whole or part. Portable wagering game management unit 240 includes components that determine whether wagering game presentation unit 232 is permitted to present wagering games.

The processor 226 is also connected to an input/output (I/O) bus 222, which facilitates communication between the wagering game machine's components. The I/O bus 222 may be connected to a payout mechanism 208, primary display 210, secondary display 212, value input device 214, player input device 216, information reader 218, and/or storage unit 230. The player input device 216 can include the value input device 214 to the extent the player input device 216 is used to place wagers. The I/O bus 222 may also be connected to an external system interface 224, which is connected to external systems 204 (e.g., wagering game networks).

Some embodiments of the invention include an audio subsystem 220. Audio subsystem 220 provides audio capabilities to the wagering game machine and may comprise an audio amplifier coupled to speakers or an audio jack, and may further include an audio programming source on a memory such as a CD, DVD, flash memory etc.

In some embodiments, architecture 200 may include a location detector 242 coupled to I/O bus 222. The location detector may be any device that can determine or assist in the determination of a current location of a portable wagering game machine incorporating architecture 200. In some embodiments, location detector 242 may be a GPS (Global Positioning System) based detector. In alternative embodiments, location detector 242 may comprise an RFID device. For example, location detector 242 may be an RFID transceiver that either reads RFID information from passive or active RFID devices. The RFID information may differ depending on the general location of the RFID device. Alternatively, location detector 242 may be an active or passive RFID device that is read by an REID transceiver. The position of the RFID transceiver may be used to determine the general location of the portable wagering game machine. In further alternative embodiments, the location detector may be a signal strength measuring system that determines the distance of the gaming machine from a wireless access point based on the strength of a signal emanating from the access point. In still further embodiments, location detection 242 may be an inertial guidance based system.

The portable wagering game architecture 200 may include a docking interface 244. Docking interface 244 communicably couples the portable wagering game machine to a docking station or other interface. The portable wagering game machine may receive power through the docking interface (e.g. to charge a batter on the portable wagering game machine). In addition, the docking interface may enable communications with other computer systems or server systems through which the portable wagering game machine may receive authentication certificates, configuration information, or other data.

In one embodiment, the wagering game machine architecture 200 can include additional peripheral devices and/or more than one of each component shown in FIG. 2. For example, in one embodiment, the wagering game machine architecture 200 can include multiple external system interfaces 224 and multiple processors 226. In one embodiment, any of the components can be integrated or subdivided. Additionally, in one embodiment, the components of the wagering game machine architecture 200 can be interconnected according to any suitable interconnection architecture (e.g., directly connected, hypercube, etc.).

In one embodiment, any of the components of the wagering game machine architecture 200 (e.g., the wagering game presentation unit 232 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 214 or devices coupled through player input device 216, the player may select any variables associated with the wagering game and place his/her wager to purchase a play of the game. In a play of the game, the processor 226 generates at least one random event using a random number generator (RNG) and provides an award to the player for a winning outcome of the random event. Alternatively, the random event may be generated by a remote computer using an RNG or pooling schema and then transmitted to the wagering game machine. The processor 226 operates the display 114 to represent the random event(s) and outcome(s) in a visual form that can be understood by the player.

In some embodiments, the architecture 200 uses the elements described above and the components and methods detailed below to determine if the portable wagering game machine 100 is in a location in which wagering games may be played by an authorized user.

Figure 3:
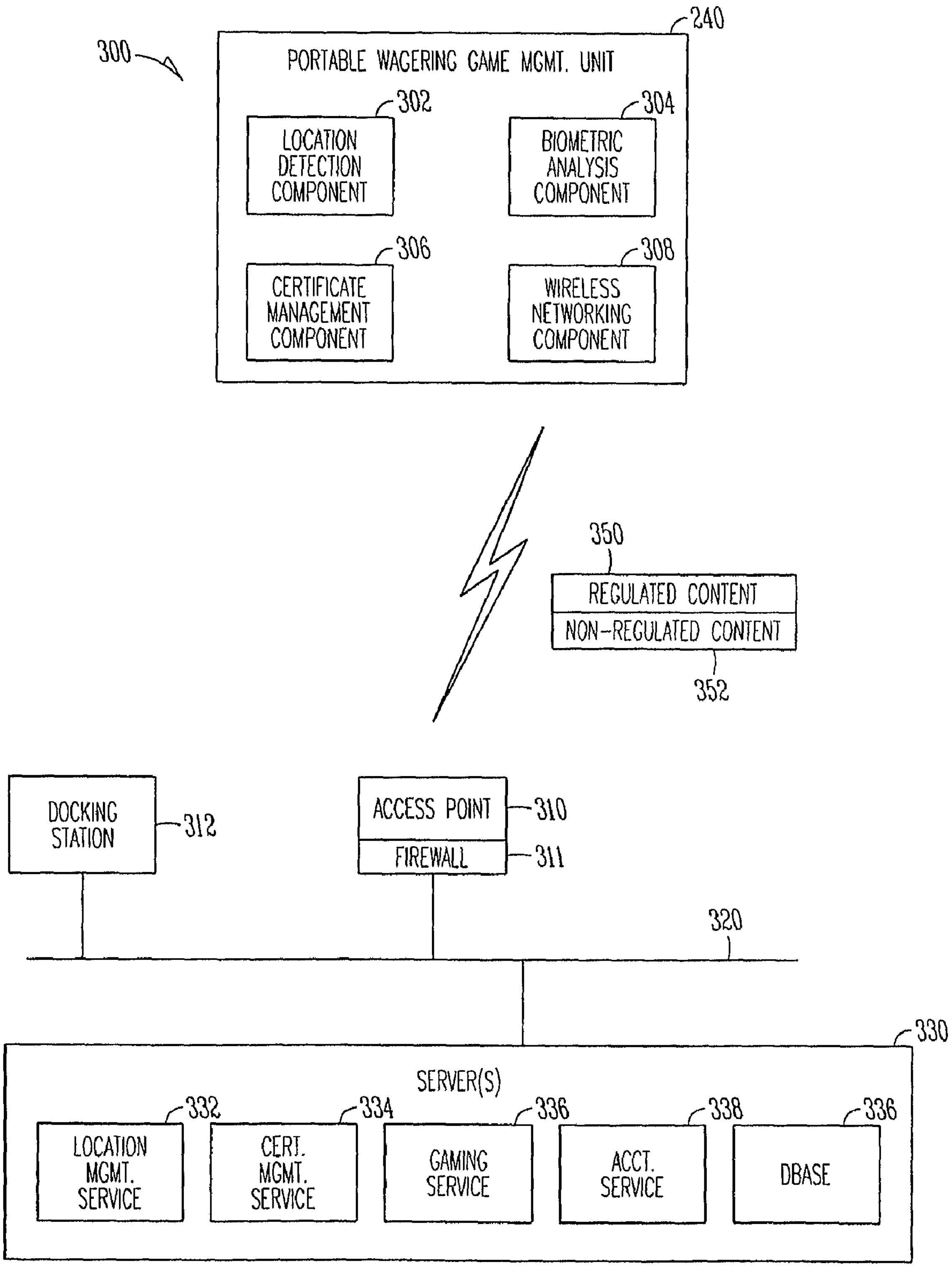
FIG. 3 is a block diagram illustrating software components for a system of wagering game machines and servers according to an example embodiment.

FIG. 3 is a block diagram illustrating major logical components of a system 300 according to embodiments of the invention, including portable wagering game management unit 240 components, service components running on one or more servers 330 and interface components such as docking station 312 and wireless access point 310.

In some embodiments, a portable wagering game machine management unit 240 may include one or more of a location detection component 302, a biometric analysis component 304, a certificate management component 306 and a wireless networking component 308. Location detection component 302 comprises software, firmware, and/or hardware that determines a current location of a portable wagering game machine 100. The location detection component may receive data from a location detector 242, or may receive data from a location management service 332 in order to determine the current location. For example, location detection component 302 may receive data from a GPS based location detector 242.

Alternatively, location detection component 302 may analyze signal strength values received via wireless networking component 308, or external system interface 224 to determine a current location. Location detection component 302 may receive multiple signal strength indications representing signal strengths from multiple access points and use the signal strength values to triangulate a location for the portable wagering game machines. For example, the location detection component 302 may be able to triangulate a position based on the beacon signals received from one or more wireless access points 310 or beacons provided by other wireless signal sources such as Bluetooth device beacons. Additionally, location detection component 302 may be able to determine a position based on the timing of the arrival of signals such as beacon signals from various types of wireless devices.

Further, location detection component 302 may receive data from an RFID transceiver that provides data on which RFID transceiver is proximate to the portable wagering game machine 100. Alternatively, the portable wagering game machine 100 may have an RFID transceiver based location detector 242 and may read passive or active RFID tags located throughout a gaming establishment. The RFID tag data may then be used to determine where the portable wagering game machine is located within the gaming establishment.

As noted above, location detection component 302 may require data from location management service 332 in order to assist in determining the location of the portable wagering game machine 100. For example, location management service 332 may provide data on the location of wireless access points, RFID transceivers, or RFID tags to assist in determining which access points, beacons, RFID transceivers or RFID tags are near the portable wagering game machine. Such data can then be used to determine a current position of the portable wagering game machine. Data regarding the location and configuration of access points 310, beacons, RFID transceivers or tags may be maintained in a database 336.

Biometric analysis component 304 may be used in some embodiments to authenticate a user of a portable wagering game machine 100. Various forms of biometric information may be used. For example, in some embodiments, biometric analysis component 304 may be used to determine if voice audio data patterns received via a microphone based biometric player information reader 152 matches previously saved voice audio data patterns for an authorized user. Similarly, biometric analysis component 304 may be used to determine if a fingerprint received from a fingerprint reader type of biometric player information reader 152 matches previously saved fingerprint data for an authorized user. The previously saved biometric data may be stored in database 336 when a user obtains a portable wagering game machine 100 from a gaming establishment or when a user registers a personal portable device as a portable wagering game machine 100.

Figure 8A:
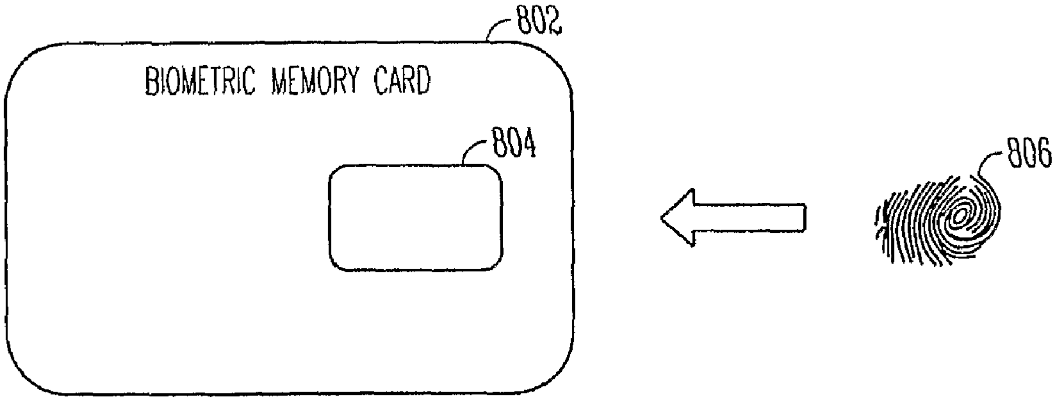
FIGS. 8A-8D are block diagrams illustrating the use of biometric information according to example embodiments.

FIGS. 8A-8D provide further details on components and methods for using biometric data according to example embodiments of the invention. FIG. 8A illustrates a biometric memory card 802. Biometric memory card 802 in some embodiments includes biometric memory material 804. In some embodiments, biometric memory material 804 retains biometric information. In some embodiments, the biometric information may be a fingerprint 806. In these embodiments, the biometric memory material 804 is a material that is pressure sensitive, and retains a readable impression of a fingerprint. In effect, the biometric memory material 804 provides a "physical negative" of a finger print. The biometric memory material may be designed such that the retention of biometric information is for a limited period of time. Various materials may be used to provide various retention times.

In some embodiments, biometric memory card 802 is similar in size to a credit card. However, the biometric memory card 802 may be of any size sufficient to include biometric memory material 804.

Figure 8B:
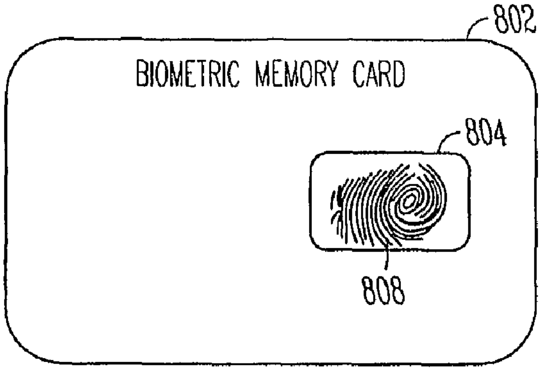

FIG. 8B illustrates a biometric memory card 802 in which the biometric memory material 804 retains a fingerprint impression 808. In some embodiments, the fingerprint impression is the result of a user applying their finger to the biometric memory material 804 with sufficient time and pressure such that an impression is left after the finger is removed.

Figure 8C:
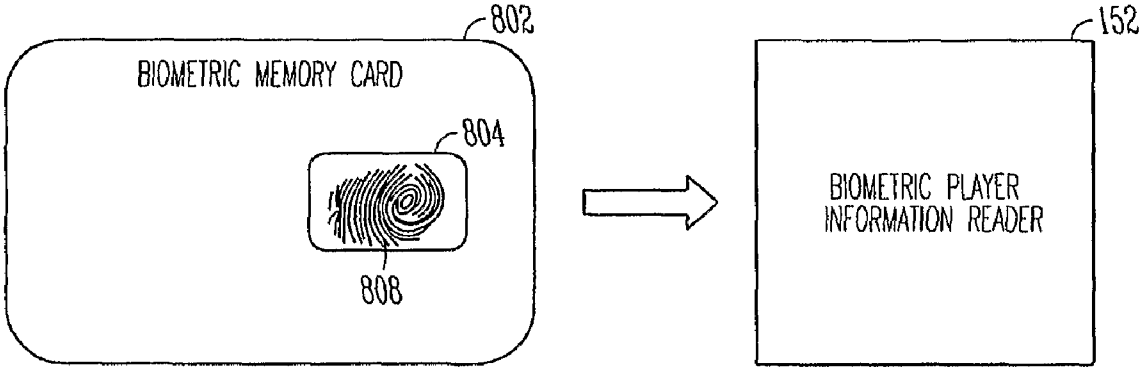

FIG. 8C illustrates the use of a biometric memory card 802 with a biometric player information reader 152. In some embodiments, biometric memory card 802 is inserted into biometric player information reader 152, which then reads the impression left on biometric memory material 804. The data read by biometric player information reader 152 may then be compared to previously stored data to verify the identity or authentication of the person providing the fingerprint impression on biometric memory material 804. In some embodiments, the previously stored data may be maintained in a database 332. In alternative embodiments, the previously stored data may be stored in a memory on the biometric memory card 802. In further alternative embodiments, the comparison and/or verification of biometric data may take place on the biometric memory card 802, with the card itself having logic circuits and memory embedded on the card enabling the biometric memory card 802 to both read and compare fingerprint data in biometric memory material 804 with biometric data previously stored on the card. The results of the verification and/or analysis may then be communicated through biometric player information reader 152.

Figure 8D:
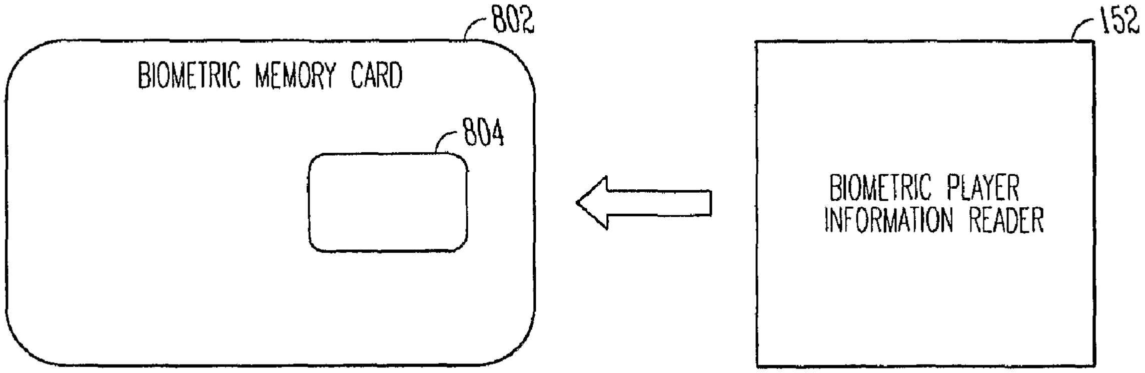

FIG. 8D illustrates a biometric card 802 in which the biometric memory material 804 no longer retains biometric information. In some embodiments, biometric player information reader 152 causes the biometric memory material to fade or be "erased" such that it no longer maintains biometric information such as a fingerprint impression. In alternative embodiments, the biometric memory material retains the biometric information for a limited period of time, such that erasure is not needed.

The biometric memory card 802 described above may be used to authorize and/or authenticate a user of a portable wagering game machine. Alternatively, it may be used to authenticate or authorize entry into particular areas of a casino, such as a "high roller" area, secure areas, or other areas where entry may be restricted. Further, the biometric memory card 802 may be used at point of sale devices a means of verifying customer identity.

The examples above have been generally discussed in the context of a biometric memory card that retains a three-dimensional fingerprint impression. It should be noted that other impressions may be retained, and further that various types of biometric memory material 804 may be used to store different types of biometric information. Such variations are within the scope of the inventive subject matter.

Returning to FIG. 3, certificate management component 306 may be used in some embodiments to implement a certificate based authentication/authorization mechanism. In some embodiments, a certificate may comprise a hash value and electronic signature data that has been encrypted using a private key and that can be decrypted using a public key. Examples of such certificates include X.509 based certificates. In some embodiments, certificates may be managed by a certificate management service 334 that tracks which certificates have been distributed to particular portable wagering game machines 100. In some embodiments, the presence of a valid certificate may used to determine if wagering is allowed on a portable wagering game machine. In alternative embodiments, certificate data may be used to restrict the availability of wagering games on a portable wagering game machine 100.

Certificates may be provided to a portable wagering game machine by certificate management service 334 when a portable wagering game machine 100 is docked to a docking station, when a portable wagering game machine 100 is first provided to a user, or at various times when a portable wagering game machine is within a gaming establishment and coupled to a network 320. Further, certificates may expire, resulting in the need to acquire a new certificate if further wagering game play is to be authorized.

Certificate management service 334 may be a certification authority (CA) or a registration authority (RA) and may serve as the root of trust for the gaming establishment. Certificate management component 334 may be responsible for personal authentication, token distribution, revocation reporting, name assignment, key generation, and generation and archival of PKI (Public Key Infrastructure) key pairs etc. with respect to certificates issued to portable wagering game machines or other servers on a network 320.

Additional details on a certificate management methods used in various embodiments of the invention are described below. Also further details on a certificate management scheme used in various embodiments are provided in copending, coassigned U.S. Patent Application Ser. No. 60/728,444, entitled "Wagering Game Machine with Certificate Management" which is hereby incorporated by reference.

Wireless networking component 308 implements wireless network communications capability. Wireless networking component 308 may include various wireless network protocols as described above, and may also include network protocols such as a TCP/IP network stack and SSL (Secure Socket Layer) protocols. Wireless networking component 308 may use external system interface 224 to communicate with an access point 310.

Wireless access point 310 provides a portable wagering game machine 100 a link through which to communicate with other servers, services, or gaming machines on a network 320. Network 320 may be a wired or wireless network. In some embodiments, the wireless access point 310 and portable wagering game machines 100 may communicate via signals over one or more communication channels. In some embodiments, the wireless access point 310 can be part of a communication station, such as wireless local area network (WLAN) communication station including a Wireless Fidelity (WiFi) communication station, or a WLAN access point (AP). In these embodiments, the portable wagering game machines 100 can be part of a mobile station, such as WLAN mobile station or a WiFi mobile station, although the embodiments of the invention are not limited in this respect.

In some other embodiments, the wireless access point 310 can be part of a broadband wireless access (BWA) network communication station, such as a Worldwide Interoperability for Microwave Access (WiMax) communication station, although the embodiments are not limited in this respect, as the wireless access point 310 can be part of almost any wireless communication device. In these embodiments, the portable wagering game machines 100 can be part of a BWA network communication station, such as a WiMax communication station, although the embodiments of the invention are not limited in this respect.

In some embodiments, network data between a portable wagering game machine 100 and a wireless access point may be generally divided into two categories, regulated content 350 and non-regulated content 352. Regulated content is that content associated with wagering games or other regulated activity. For example, regulated content 350 may be software controlling the presentation of a wagering game on a portable wagering game machine. Such content includes the wagering game application (if downloaded to a wagering game machine), transactional data associated with wagering, or content generated by a central RNG determining system such as gaming service 336. Non-regulated content 352 may include content such as games that do not involve wagering, advertising content, e-mail content, etc. that does not require or involve regulatory approval.

In some embodiments, regulated content 350 may be transmitted over certain predetermined wireless channels, while non-regulated content may be transmitted over other predetermined wireless channels. Similarly, regulated content may be provided over certain predetermined TCP/IP ports, while non-regulated content may be provided over other predetermined TCP/IP ports.

In some embodiments, a firewall 311 may be present. Firewall 311 may be integrated with a wireless access point 310, it may be integrated with a server 330 on network 320, or it may be a separate standalone unit on network 320. Firewall 311 may be configured to allow traffic on certain ports to pass through while restricting traffic on other ports. Thus if an access point 310 is in an area where wagering games are allowed, a firewall 311 may be configured to pass regulated content 350. Conversely, if an access point 310 is in an area where wagering games are not allowed, the firewall 311 may be configured to filter regulated content 350 while passing non-regulated content 352.

As noted above, various services may be provided by one or more servers 330 on a network 320. Location management service 332 may provide data to a portable wagering game device to assist the portable wagering game device in determining its location. Alternatively, location management service may determine a location for a portable wagering game device based on data received from the portable wagering game device, wireless access points, RFID transceivers or other entities on network 320. In some embodiments, location data for beacons, access points, RFID transceivers, or RFID tags may be stored by location management service 332 in a database 336.

Gaming service 336 may provide various types of services to a portable wagering game device. Gaming service 336 may provide games to be downloaded on the portable wagering game device. Gaming service 336 may include a RNG that generates a random number to be used by the portable wagering game device to determine the outcome of a wagering game.

Accounting service 338 may provide accounting related services for a portable wagering game, including the amount available for wagering in the player's account, amounts won during a wagering game play, or other financial or other sensitive data. It is desirable to provide an accounting service 338 so that financial or other sensitive data is not lost should a portable wagering game lose power or be damaged in some way.

It should be noted that although services 332-338 have been shown as being provided by a single server, the services or functions provided by the services may be distributed across multiple servers in various combinations.

Figure 4:
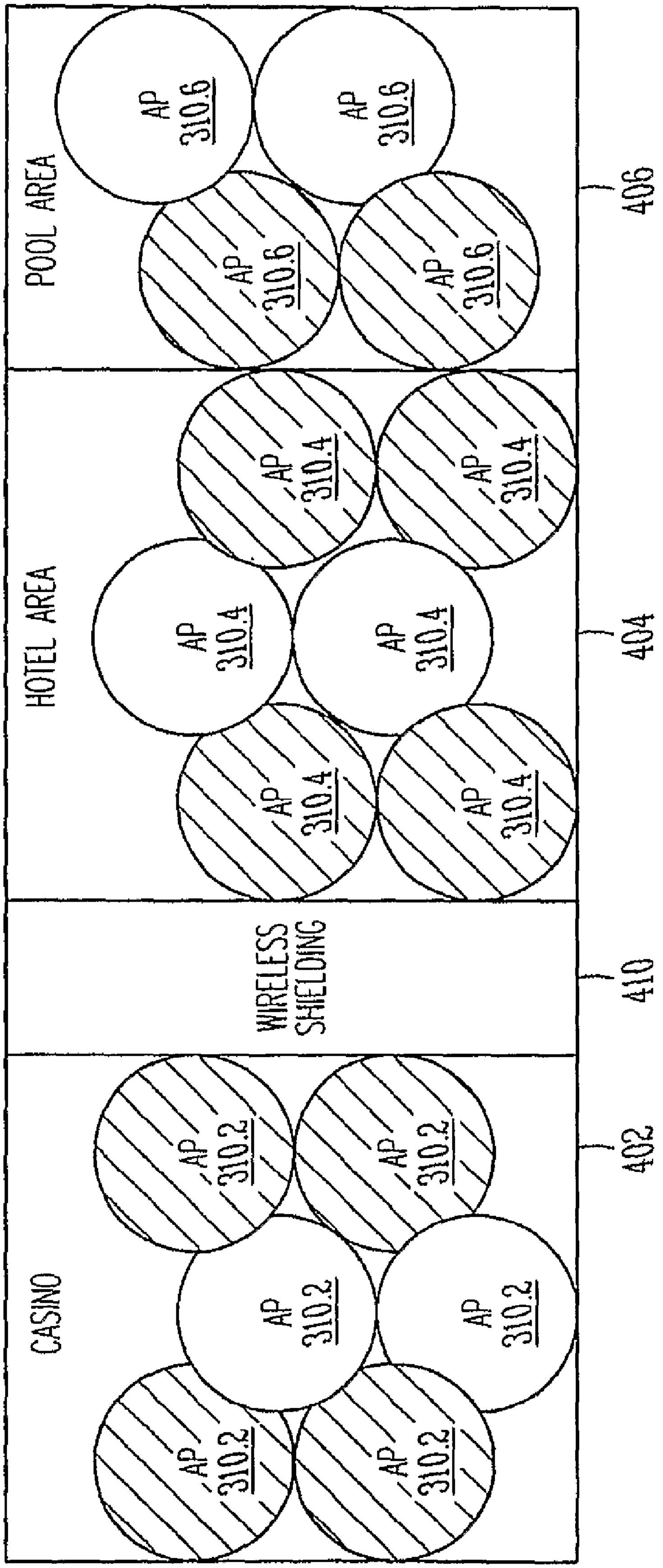
FIG. 4 is a block diagram of an example configuration of access points in gaming establishment.

FIG. 4 is a block diagram of an example configuration of access points in gaming establishment and is used to illustrate embodiments of the invention. A gaming establishment 400 may be divided into multiple areas 402-406. The areas may differ in whether wagering games are allowed, and what types of regulatory games are allowed. For example, a gaming establishment may be divided into a casino area 402, a hotel area 404 and a pool area 406, each area having one or more access points 310 distributed within the area. For the purposes of the example shown in FIG. 4, wagering games may be allowed in casino area 402, but not allowed in hotel area 404. Further, wagering games may be allowed in pool area 406, but only allowed customers meeting certain criteria, such as frequent players, player customarily wagering large amounts, or other criteria. It should be noted that restrictions on where wagering games may be played may be based on governmental regulations, or they may be based on gaming establishment policy.

Certain access points 310 may be designated as "boundary" access points (indicated as shaded access points in FIG. 4). In some embodiments, such boundary access points may be used to assist in determining if a portable wagering game machine 100 is transitioning from an area where wagering games are allowed to an area where wagering games are not allowed and vice versa.

In some embodiments, wireless shielding 410 may be placed between areas of a gaming establishment to separate areas were wagering games are allowed from areas where wagering games are not allowed. The wireless shielding may be used to prevent signals from a wireless access point in an area where gaming is allowed (e.g. wireless access points 310.2) from reaching portable wagering game machines located in areas where wagering games are not allowed (e.g. area 404). The wireless shielding 410 may be passive in that it prevents signals from entering gaming restricted areas. For example, thick concrete walls, metal barriers or other passive structures may be used.

In alternative embodiments, active wireless shielding may be used. In these embodiments, devices are used to generate a signal that interferes with signals generated by access points in areas where gaming is allowed so that the signals cannot be received or correctly interpreted by portable wagering game machines located in areas where wagering games are not allowed. For example, an active wireless shielding device may generate a jamming signal that jams wireless channels, for example channels used to carry regulated content.

Additionally, active wireless shielding may comprise devices that generate a signal that doesn't necessarily jam or interfere with signals carrying regulated game content. When the signal is detected by a portable wagering game machine 100, wagering games are disabled.

In the example shown in FIG. 4, assume that a player has entered the hotel area of the gaming establishment, and has been provided with a portable wagering game machine (or alternatively, has brought a personally owned device upon which wagering games may be played). While in the hotel area 404, the portable wagering game machine may be prevented from presenting wagering games. However, in some embodiments, the portable wagering game machine may be able to present e-mail applications, advertising content, or other non-regulated content or software applications while in areas where wagering games are not allowed.

Next assume that the player enters the casino area 402. The systems and methods described herein determine that the player is in an area where wagering games are allowed, and such wagering games are enabled on the portable wagering game machine.

Next assume that the player leaves the casino area 402 to go to the pool area 406. As the player leaves the casino area and enters the hotel area 404, wagering games are disabled on the portable wagering game machine. Then as the player leaves the hotel area 404 and enters the pool area 406, wagering games may be enabled on the player's portable wagering game machine 100.

Figure 5:
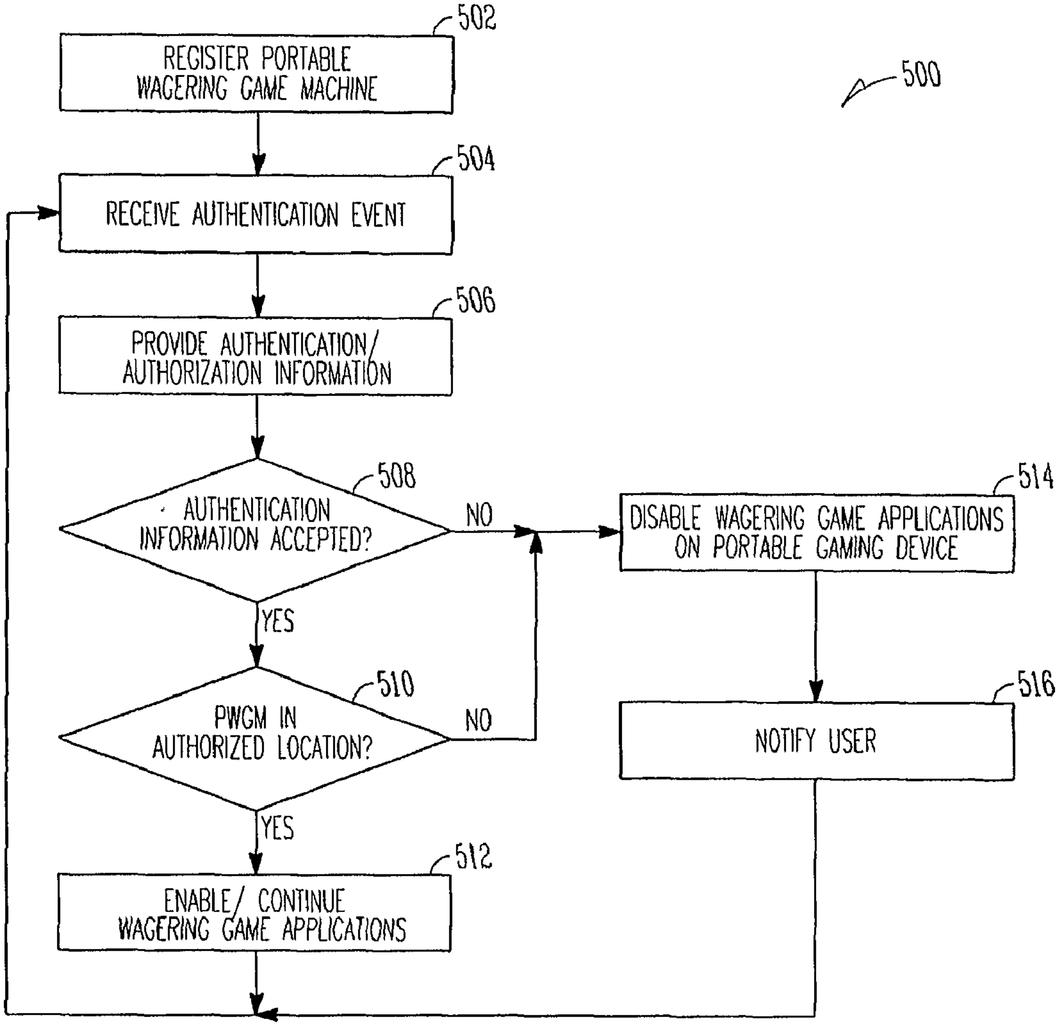
FIGS. 5-7 are flowcharts illustrating methods for managing portable wagering game machines according to example embodiments.
Figure 6:
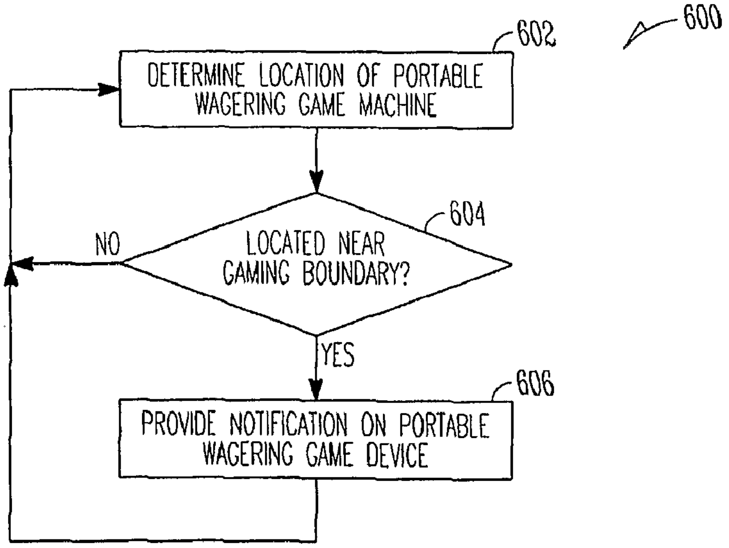
Figure 7:
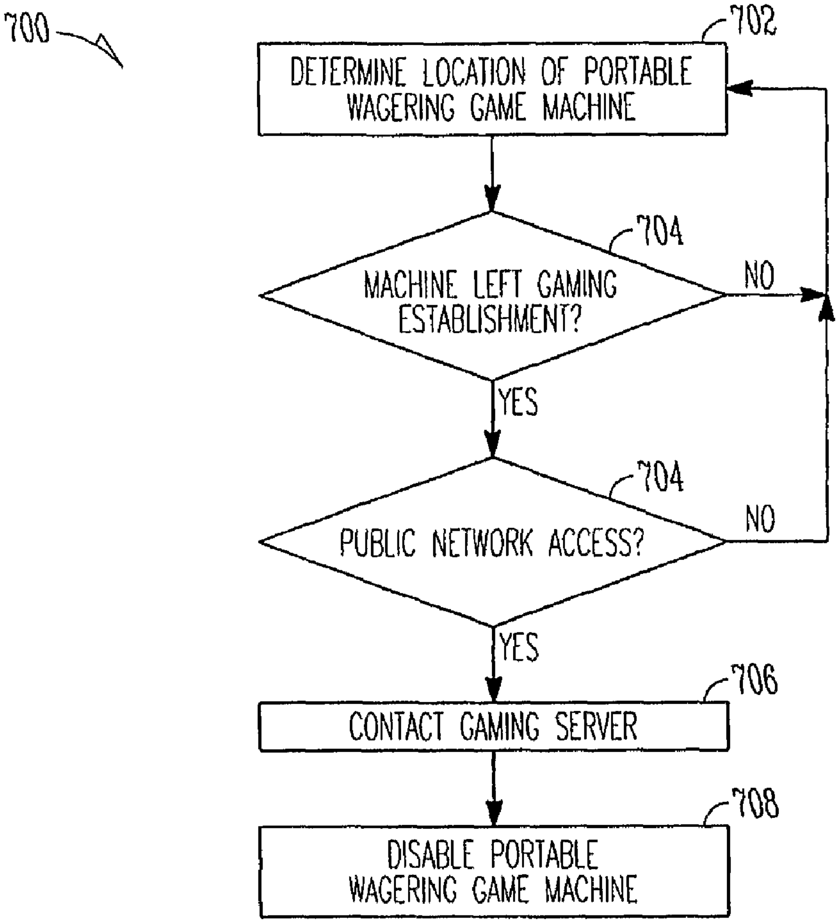

FIGS. 5-7 are flowcharts illustrating methods for managing portable wagering game machines according to example embodiments. The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIGS. 5-7 are inclusive of acts that may be taken by an operating environment executing an exemplary embodiment of the invention.

FIG. 5 illustrates a method 500 for managing a portable wagering game machine according to embodiments of the invention. In some embodiments, the method begins at block 502 by registering a portable wagering game machine. Several types of activities may be included in the registration. For example, in some embodiments, a biometric sample such as a voice pattern, a fingerprint pattern, or an iris pattern may be obtained from an authorized user of the portable wagering game machine 100. The biometric pattern may then be stored for later use in determining if a current user of the portable wagering game machine is an authorized user. Other data regarding a user may be obtained as part of the registration activity. For example, demographic data may be obtained, credit card data may be obtained, or player tracking card data may be obtained as part of the registration activity.

In addition, registration activity may include installing certificates on the portable wagering game machine that either allow or disallow wagering games or certain wagering activities on the portable wagering game machine. In some embodiments, the system may use the following information to create and install a certificate on a portable wagering game machine:

IP address or domain name of a Certificate Service (if there is one)

A CA certificate

Portable wagering game machine or server private and public keys

Portable wagering game machine certificate or server certificate

In some embodiments, configuration information may be entered locally on a portable wagering game machine through an administrative interface. In the case where there is a certificate service (e.g. certificate management service 334), the IP address or domain name of the certificate service can be entered using any of the following:

through an administrative interface, bundled with the certificate distribution, or through automated means such as DHCP or DNS.

The CA of the gaming establishment may create an X.509 version 3 certificate for itself, for each portable wagering game machine 100 and for each server 330. The CA generates private/public key pairs. Additionally, the CA may receive a public key from a portable wagering game or server and generate a valid X.509 version 3 certificate.

Certificates may be initially distributed during registration through the docking interface, through a hardware device such as a PROM, USB memory device, compact flash etc or through a network connection.

Additionally, identification details for the portable wagering game machine maybe obtained, such as a MAC (Media Access and Control) address for a wireless interface on the portable wagering game machine.

Next, at block 504 an authentication event occurs. The authentication event may be any one of a number of different types of events or combinations of events. In some embodiments, the authentication event may include a timer expiration event. For example, the portable wagering game machine may need to re-authenticate at a predetermined time interval. In cases where a user needs to enter or provide data, the predetermined time interval may be relatively long such as every 15 minutes. In cases where information may be automatically provided, the interval may be shorter, such as every 15 seconds. The embodiments are not limited to any particular interval.

In some embodiments, the authentication event comprises an access point handoff. In these embodiments, re-authentication occurs when the portable wagering game machine leaves a signal area for one access point and enters the signal area of a second access point.

In some embodiments, the authentication event comprises a transition to a new area. This is similar to the access point handoff event described above, but occurs for handoffs between boundary access points rather than every access point handoff.

In some embodiments, the authentication event comprises a wagering game transaction. In these embodiments, re-authentication occurs every time a wagering game transaction (e.g. a transaction representing a play of the wagering game) occurs. The authentication information and location information described herein may be included as part of the wagering game transaction data.

At block 506 the system then proceeds to obtain and provide authentication information. The authentication information may be used to verify that the current user is an authorized user and that the portable wagering game machine has not been intentionally or unintentionally provided to an unauthorized user. In some embodiments, the authentication information may include one or more of the following:

- Biometric Information—The user may be required to provide biometric input to continue a wagering game.
- Credit Card Information—The user may be required to swipe a credit card through a card reader on the portable wagering game machine.
- Player Tracking Card Information—The user may be required to swipe a player tracking card through a card reader on the portable wagering game machine.
- Certificate Information—The portable wagering game machine may exchange certificate information with a certificate management component using SSL or TSL techniques. The certificate may need to be renewed if near the expiration time of the certificate.
- Password/PIN Entry—The user may be required to enter a password or PIN (Personal Identification Number).
- Authentication Fob Presence—The portable wagering game machine may detect whether or not an authentication fob is near the portable wagering game machine.

In some embodiments, at least two of the above factors must be provided in what is referred to as two-factor authentication. For example, a user may be required to provide a biometric sample (e.g. voice, fingerprint, iris) and provide a password. Or, a certificate and a password may be provided. Various combinations are possible and within the scope of the inventive subject matter.

At block 508, the system checks the authentication information to determine if it is acceptable and/or valid. Biometric information, passwords, PINs, credit card information, or player tracking card information may be compared to previously provided information to make sure there is a match and that the current player is the same player as was originally authorized to use the portable wagering game machine.

A certificate management component may compare certificate details to make sure the portable wagering game machine is authorized to present wagering games. In some embodiments, a portable wagering game machine 100 will send its certificate (digitally signed by the CA) to the certificate management service 334. The certificate management service 334 will use the CA certificate and the portable wagering game machine certificate to determine if the portable wagering game machine certificate is valid. The portable wagering game machine certificate will also be checked on the Certificate Revocation List (CRL) at the certificate management service 334 to see if it has been revoked.

A similar certificate check may take place at the portable wagering game machine. That is, the certificate management service 334 sends its certificate to the portable wagering game machine 100 as part of a SSL/TLS handshake. The portable wagering game machine 100 validates the server certificate.

At block 510, the system checks to determine if the portable wagering game machine is in an authorized location, i.e. in a location where wagering games are allowed. Various mechanisms may be used to determine the location of the portable wagering game machine. As discussed above, these methods include utilizing GPS data, Access Point assignment, signal strength from a beacon provided by an access point or other wireless device, triangulation based on signal strengths, RFID based detection based on the known location of an RFID transceiver or RFID tag, or other suitable method of determining a device location.

If the checks at blocks 508 and 510 indicate that an authorized player is using the portable wagering game machine and that the portable wagering game machine is in an authorized location, then at block 512 the system allows wagering game play to continue, or enables wagering game play on the portable wagering game machine if it had been previously disabled. Enabling or allowing the continuance of wagering game play may involve installing or renewing a certificate allowing wagering game play, installing wagering game software, removing a certificate that restricts wagering game play, or altering configuration data to indicate that wagering game play is allowed.

If the checks at block 508 and 510 indicate that either an authorized player cannot be verified, or that the portable wagering game machine is not in a location where wagering game play is allowed, then at block 514 the system disables the presentation of wagering game. Disabling wagering game play may involve removing a certificate allowing wagering game play, installing a certificate restricting wagering game play, altering configuration data to disable wagering game play, or removing wagering game software from the portable wagering game machine. It should be noted that other applications such as email, web browsers or other applications presenting unregulated content may be allowed to continue even if presentation of wagering games is disabled.

In some embodiments, the system may notify a player of a change in the status of wagering game play on the portable wagering game machine at block 516.

For example, if wagering game play has been disabled, a graphical icon or dialog box may be presented on displays 114 or 116 of the portable wagering game machine. Additionally, a colored light may be used to indicate when wagering games may be presented. Similarly, a graphical icon or dialog box may be presented if wagering game play has been enabled. Additionally, audible indicators or physical indicators (e.g. vibration) may be used to indicate that wagering games are no longer allowed on the portable wagering game machine 100.

FIG. 6 illustrates a method 600 for managing a portable wagering game machine in accordance with embodiments of the invention. The method begins at block 602 by determining the location of the portable wagering game machine. Various methods as discussed above may be used to determine the location. At block 604, the system determines if the location is near a gaming boundary, that is, a boundary between an area where wagering games may be presented and an area where wagering games may not be presented.

If the portable wagering game machine is near a gaming boundary, then at block 606 a notification may be provided to the user. In some embodiments, the notification may be a graphical notification such as a dialog box or icon indicating the user is near a gaming boundary. In alternative embodiments, the notification may be an audible notification such as a beep, buzzer, audio data, spoken text etc. In further alternative embodiments, the audible notification may be a physical notification such as causing the portable wagering game machine to vibrate. Combinations of notification types may be used.

The notification mechanism may be used to warn the user that they are nearing a point where wagering games are no longer allowed, or that the user is nearing a point where wagering games may be enabled. This notification is desirable because a user that desires to continue wagering game play may not be aware that they are nearing a location where wagering game play is not allowed.

FIG. 7 illustrates a method 700 for managing a portable wagering game machine according to embodiments of the invention. The method begins at block 702 by detecting a location of a portable wagering game machine. Various methods of locating a portable wagering game machine have been described above.

At block 704, the system determines if the portable wagering game machine has left the gaming establishment. If the portable wagering game machine has left a gaming establishment, at block 706 the portable wagering game machine determines if it has access to a public network. As an example, the portable wagering game machine may have been removed from the gaming establishment, and later taken to a location providing public Internet access such as a coffee shop or library.

At block 706, the portable wagering game machine may use the network access to contact a gaming server. The gaming server may then determine if the portable wagering game machine is to be disabled. If so, at block 708 the gaming server sends data or one or commands to the portable wagering game that causes the portable wagering game machine to disable itself. In some embodiments, the portable wagering game machine may clear some or all of its memory. In alternative embodiments, the portable wagering game machine may remove wagering game applications from persistent storage. In further alternative embodiments, the portable wagering game machine physically disables itself. For example, a fusable link may be blown thereby interrupting a required circuit, or causing damage to the components of the portable wagering game machine. Alternatively, the portable wagering game machine may be disabled by causing an ASIC (Application Specific Integrated Circuit) required for presenting a wagering game on the portable wagering to cease functioning.

In some embodiments, the portable wagering game may be permanently or semi-permanently disabled if there is a long period of inactivity (e.g. three months) or upon reception of a signal from a gaming establishment.

CONCLUSION

Systems and methods for managing portable wagering game machines have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A wagering game system configured to transmit gaming signals via a wireless communications network, the gaming signals including regulated game content, the system comprising:

a handheld wagering-game machine configured to receive and interpret the gaming signals and to present a wagering game associated with the regulated game content;

at least one wireless-network access point transmitting the gaming signals to a wagering-approved area and a non-wagering area; and at least one active shielding component generating a shielding signal that interferes with the transmitted gaming signals such that the handheld wagering-game machine is prevented from receiving the gaming signals when the handheld wagering-game machine is in the non-wagering area, and the gaming signals can be received when the handheld wagering-game machine is in the wagering-approved area.

2. The system of claim 1, further comprising a location detection component that determines the location of the handheld wagering-game machine, wherein the gaming system verifies the location of the handheld wagering-game machine is in the wagering-approved area.

3. The system of claim 1, further comprising a passive shielding component that prevents the gaming signals from entering the non-wagering area.

4. The system of claim 1, wherein the handheld wagering-game machine includes an authentication component operable to authenticate a user, and wherein the gaming system verifies the authentication of the user.

5. The system of claim 4, wherein the authentication unit detects a presence of an authentication fob.

6. A method of controlling a handheld wagering-game machine, the method comprising:

transmitting, via at least one wireless-network access point of a wireless communications network, gaming signals to a wagering-approved area and a non-wagering area, the gaming signals including regulated game content;

generating, via at least one active shielding component, a shielding signal that interferes with the transmitted gaming signals such that the handheld wagering-game machine is prevented from receiving the gaming signals when the handheld wagering-game machine is in the non-wagering area, and the gaming signals can be received and interpreted correctly when the handheld wagering-game machine is in the wagering-approved area.

7. The method of claim 6, further comprising receiving, via the wireless communications network, authentication information associated with the handheld wagering-game machine and verifying the received authentication information.

8. The method of claim 7, wherein the authentication information includes one or more of biometric information, password information, credit card information, and data indicating a presence of an authentication fob.

9. The method of claim 6, wherein the shielding component generates a jamming signal that disrupts a transmission of the regulated game content.

10. A method of controlling a handheld wagering-game machine connected to a wireless communications network, the network transmitting gaming signals via at least one wireless-network access point to a wagering-approved area and a non-wagering area, the gaming signals including regulated game content for presenting a wagering game on the handheld wagering-game machine, the method comprising:

wirelessly connecting, via the wireless-network access point, the handheld wagering game machine to a gaming server and exchanging data between the handheld wagering-game machine and the gaming server;

transmitting, via an active shielding component, a jamming signal that interferes with the transmitted gaming signals such that the gaming signals cannot be interpreted correctly by the handheld wagering-game machine when the handheld wagering-game machine is in the non-wagering area, and can be interpreted correctly when the handheld wagering-game machine is in the wagering-approved area; and in response to data received from the gaming server, selectively disable, via one or more processors, the handheld wagering-game machine when the handheld wagering-game machine is in the wagering-approved area.

11. The method of claim 10, wherein selectively disabling the handheld wagering-game machine includes clearing at least a portion of memory device in the handheld wagering-game machine.

12. The method of claim 10, wherein selectively disabling the handheld wagering-game machine includes causing physical damage to one or more components of the handheld wagering-game machine.

13. The method of claim 10, further comprising determining a location of the handheld wagering-game machine and transmitting an alert including the location.

14. The method of claim 13, wherein the alert is transmitted in response to the location being proximal to the non-wagering area.

15. The method of claim 13, wherein the alert is transmitted to the handheld wagering-game machine and causes one or more of a displayed alert, an audible alert, and a physical alert.

16. A non-transitory machine-readable medium including instructions that, when executed by a gaming system, cause the gaming system to perform the method comprising:

transmitting, via at least one wireless-network access point of a wireless communications network, gaming signals to a wagering-approved area and a non-wagering area, the gaming signals including regulated game content;

generating, via at least one active shielding component, a jamming signal that interferes with the transmitted gaming signals such that the gaming signals cannot be interpreted correctly, or both, by the handheld wagering-game machine when the handheld wagering-game machine is in the non-wagering area, and can be interpreted correctly when the handheld wagering-game machine is in the wagering-approved area.

17. The medium of claim 16, wherein the gaming system is connected for communication to a communications network, and wherein the medium resides on a memory device connected to the communications network.

18. The medium of claim 17, wherein the memory device is part of a gaming server.

* * * * *

UNITED STATES PATENT AND TRADEMARK OFFICE

CERTIFICATE OF CORRECTION

PATENT NO. : 8,267,792 B2
APPLICATION NO. : 12/297915
DATED : September 18, 2012
INVENTOR(S) : Buchholz et al.

It is certified that error appears in the above-identified patent and that said Letters Patent is hereby corrected as shown below:

On Title page 2, in column 2, item [56] under "Other Publications", line 2, delete "4pgs." and insert --4 pgs.--, therefor In the Specification In column 2, line 21, after "illustration", insert --,--, therefor In column 5, line 40, before "part", insert --be--, therefor In column 6, line 42, delete "REID" and insert --RFID--, therefor In column 6, line 56, delete "batter" and insert --battery--, therefor In column 9, line 37, before "a", insert --as--, therefor In column 9, line 57, after "may", insert --be--, therefor In column 11, line 65, after "allowed", insert --to--, therefor In column 13, line 53, delete "etc" and insert --etc.--, therefor In column 16, line 38, before "commands", insert --more--, therefor In the Claims In column 17, line 57, in claim 6, after "received", delete "and interpreted correctly", therefor In column 18, line 53, in claim 16, after "correctly,", delete "or both,", therefor Signed and Sealed this
Twenty-sixth Day of November, 2013

Margaret A. Focarino
*Commissioner for Patents of the United States Patent and Trademark Office*